Dec. 3, 1957  R. S. SHEP  2,814,911
PLANTER POT
Filed April 25, 1955

INVENTOR.
ROSE S. SHEP
BY C. G. Stratton
ATTORNEY

United States Patent Office 2,814,911
Patented Dec. 3, 1957

2,814,911

PLANTER POT

Rose S. Shep, Seal Beach, Calif.

Application April 25, 1955, Serial No. 503,759

1 Claim. (Cl. 47—38)

This invention relates to a flower or planter pot.

An object of the present invention is to provide a flower-planting pot that enables simple and effective control of water to the roots of the plant and also provides for aeration. Certain plants, such as African violets, require not only careful watering but also insurance of continuous circulation of air around the roots. The present pot construction enables such water and air control.

Another object of the invention is to provide a pot of the character referred to that provides for watering from beneath as well as aerating from beneath.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Figure 1:
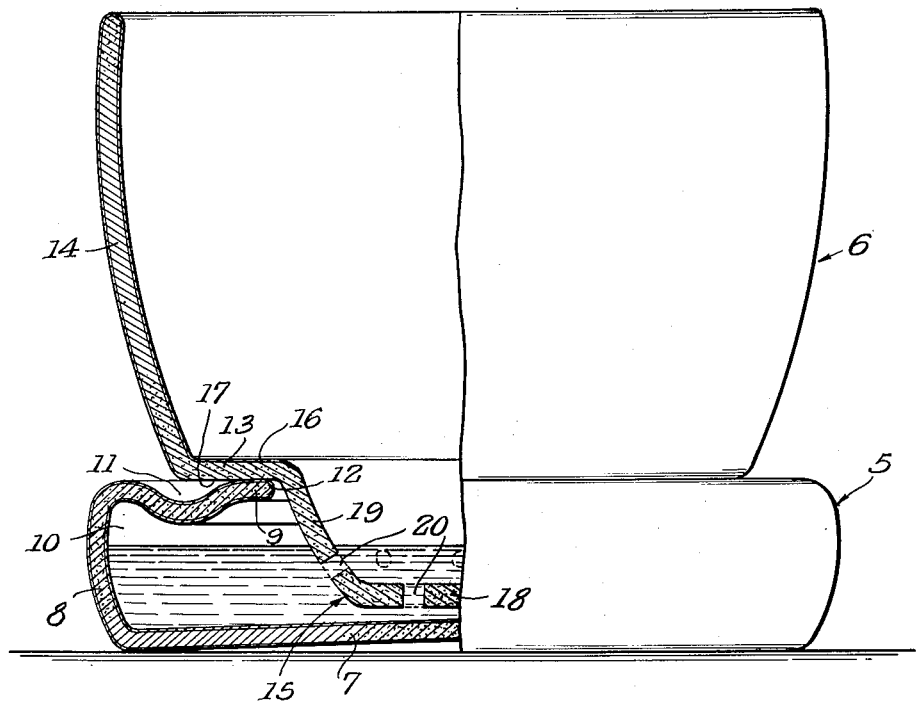
Fig. 1 is a side elevational view, in quarter section, of a preferred form of flower-planting pot according to the present invention.

The present pot, as shown in Fig. 1, comprises a base 5 and a separable bowl 6, the latter being supported by the former preferably without attaching means.

The base 5 may be formed of any suitable material providing the same is liquid impervious. Thus, as shown, the same may comprise glazed ceramic, at least those surfaces thereof that are in contact with water placed in the base being glazed to be impervious.

The base 5 that is illustrated in Fig. 1 has a bottom wall 7, side walls 8, and an upper inreaching flange wall 9, said walls defining a water-holding interior 10. In the present instance, flange wall 9 may be formed to have an annular trough or gutter 11 that may be concentric with the inner opening 12 formed by the wall 9.

The bowl 6 is preferably formed of ceramics of a porous nature, the same being provided with an annular horizontal support part 13, a bowl part 14 extending upward from the outer edge of part 13, and a depending part 15 extending from the inner edge of part 13.

The bowl part 14 is preferably glazed both on its inner and outer faces, as shown. The part 13 may be glazed on its upwardly facing surface 16 and preferably unglazed on the surface 17 thereof that rests upon the flange wall 9 of base 15. Said part 13, being in overstanding relation to trough 11, exposes its porous surface 17 to the atmosphere. Thus, air may pass into the interior of the bowl through wall 13 and unglazed dependency 15.

The bowl part 15, as indicated, is unglazed and, therefore, the pores therein exert capillary force for drawing water from the interior 10 of base 5 to the inner side of said bowl part 15. As shown, the latter part has a preferably flat bottom wall 18 and a conical wall 19 connects wall 18 to the inner edge of flange wall 13.

In some instances, the porosity of the unglazed walls and surfaces, as above described, is sufficient to effect a suitable transfer of the water in the base into the interior of bowl 6 to moisten the soil or other planting medium disposed in the bowl. Aeration is effected, as above described, and may be further increased by any irregularities of interfit of walls 9 and 13 and passage of air through the resulting spaces. In any case, aeration may depend on the porosity of the walls, as indicated.

It may be desired to provide wall 18, alone, or both said wall and wall 19 with perforations 20 which not only more quickly pass some of the water to the inside of the bowl but also serves to allow some of the roots of the plant to pass therethrough for direct immersion in the water in interior 10.

Figure 2:
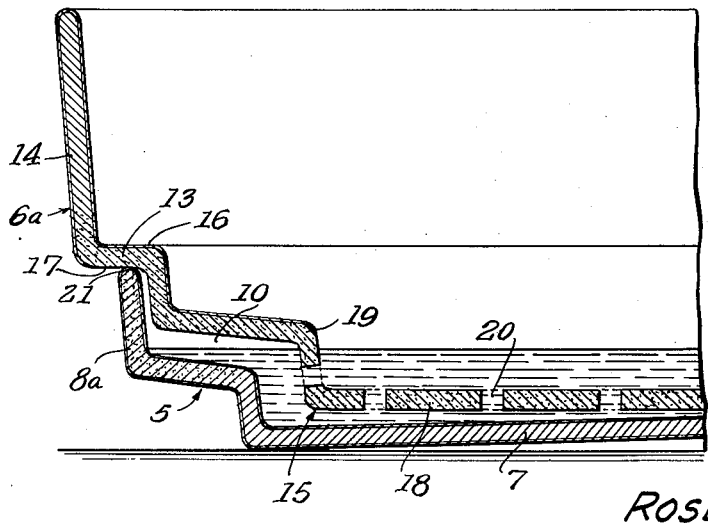
Fig. 2 is a fragmentary cross-sectional view of another form of pot according to the invention.

In the form of Fig. 2, the base 5a may have flange wall 9 omitted and the bowl 6a may be supported on the upper edge 21 of the side wall 8a. The bowl 6a is essentially the same as described for bowl 6. Whatever changes in contour that are shown in Fig. 2, are variables. This modification will function in the same manner as the earlier-described pot.

Of course, the shape of the pot in plan is not material, since the same may be round, rectangular or have any desired shape.

While the foregoing has illustrated and described what are now contemplated to be the best modes of carrying out the invention, the constructions are, of course, subject to modification without departing from the spirit and scope of the invention. It is, therefore, not desired to restrict the invention to the particular forms of construction illustrated and described, but to cover all modifications that may fall within the scope of the appended claim.

Having thus described the invention, what is claimed and desired to be secured by Letters Patent is:

A two-part planter pot comprising a base having an interior for containing water, an inwardly extending flange around the upper edge of said base, said flange having an annular trough therein, and a bowl supported on said flange, said bowl having an inwardly extending wall in overstanding relation to said trough and a portion depending downwardly from said wall, the wall and depending portion of said bowl being unglazed to permit air to pass into the bowl from the trough when the depending portion extends into water contained in the base.

References Cited in the file of this patent

UNITED STATES PATENTS

| | | |
|---|---|---|
| 918,563 | Lewis | Apr. 20, 1909 |
| 2,130,234 | Haglund | Sept. 13, 1938 |
| 2,344,202 | Carlson | Mar. 14, 1944 |
| 2,344,794 | Vallinos | Mar. 21, 1954 |